United States Patent
Kim et al.

(10) Patent No.: US 7,470,309 B2
(45) Date of Patent: Dec. 30, 2008

(54) MANUFACTURING METHOD FOR ULTRA FINE COMPOSITE POWDER OF TUNGSTEN CARBIDE AND COBALT

(75) Inventors: Sang-Myun Kim, Chungcheongbuk-do (KR); Hyun-Ho Lee, Seoul (KR); Min-Sun Hur, Chungcheongbuk-do (KR)

(73) Assignee: Nanotech Co., Ltd., Chungcheongbuk-do (KR)

( * ) Notice: Subject to any disclaimer, the term of this patent is extended or adjusted under 35 U.S.C. 154(b) by 239 days.

(21) Appl. No.: 11/413,348

(22) Filed: Apr. 27, 2006

(65) Prior Publication Data

US 2007/0214911 A1    Sep. 20, 2007

(30) Foreign Application Priority Data

Mar. 17, 2006    (KR) .................... 10-2006-0024813

(51) Int. Cl.
B22F 9/20    (2006.01)
(52) U.S. Cl. ............................ 75/351; 75/360; 148/207
(58) Field of Classification Search .................. 75/351, 75/360; 148/207
See application file for complete search history.

(56) References Cited

U.S. PATENT DOCUMENTS 5,230,729 A * 7/1993 McCandlish et al. .......... 75/351
5,882,376 A    3/1999 Kim et al.
5,885,372 A * 3/1999 Seegopaul ................... 148/237
6,511,551 B2    1/2003 Kim et al.

FOREIGN PATENT DOCUMENTS

KR    10-2003-0024174 A    3/2003

* cited by examiner

Primary Examiner—George Wyszomierski
(74) Attorney, Agent, or Firm—Blakely, Sokoloff, Taylor & Zafman LLP

(57) ABSTRACT

The present invention relates to an economically excellent method for manufacturing ultra fine tungsten carbide-cobalt composite powder having tungsten compound and cobalt compound as its raw material. More particularly, the present invention provides a manufacturing method comprising a process for mixing tungsten compounds, cobalt compounds, grain-grown inhibitor compounds and oxide in a mechanical method, a calcination process for removing ammonia and moisture of the mixed powder and forming it into an composite oxide, a reduction process for manufacturing said calcined powder into pure metal powder, a mixing process for adding carbon source to said reduced powder, and a carburization process for manufacturing the mixed powder into a tungsten carbide-cobalt composite powder, which is the final form. Using the manufacturing method of the present invention, ultra-fine tungsten carbide-cobalt composite powder having an ultra-fine particle size of 0.1~0.2 µm, 0.2~0.3 µm, 0.3~0.4 µm and high properties such as high hardness, high toughness wherein the binder phase is uniformly mixed can be manufactured. In particular, a tungsten carbide-cobalt composite powder having economic advantages through price competitiveness of the compound using tungsten compounds and cobalt compounds and simplification of process can be manufactured.

10 Claims, 7 Drawing Sheets

MANUFACTURING METHOD FOR ULTRA FINE COMPOSITE POWDER OF TUNGSTEN CARBIDE AND COBALT

CROSS-REFERENCE TO RELATED APPLICATIONS

The present patent application claims priority from Korean Patent Application No. 10-2006-0024813, filed on Mar. 17, 2006.

BACKGROUND OF THE INVENTION

1. Field of the Invention

The present invention relates to a method for manufacturing ultra fine tungsten carbide-cobalt composite powder. More particularly, it relates to a method for manufacturing ultra fine tungsten carbide-cobalt composite powder by going through calcination process, reduction process, carburization process successively at a certain reaction temperature in a given each gas atmosphere, after original and efficient dry-mixing tungsten compounds with cobalt compounds.

2. Description of the Related Art

Tungsten carbide-cobalt composite powder have high hardness and excellent wear resistance, and thus is widely used for cutting tools, wear resistant tools, impact resistant tools and metal mold material, etc. Also, as the tungsten carbide (WC) particles get ultra fine, it has high hardness and wear resistant properties, and has mechanical properties of higher toughness than that of other cutting material due to a effect of Co binder phase.

According to the method for manufacturing tungsten carbide (WC) powder, which is currently being industrially mass-produced, tungsten carbide (WC) powder is manufactured by pulverizing carburization powder prepared by calcinating and reducing tungstic acid ($H_2WO_4$), ammonium para-tungstate (APT) extracted from tungsten mineral into an appropriate size by a milling process, mixing carbon powder into the carbonizing the mixture at high temperature of at least 1400. In order to make this into a commercial product, various tools including cutting tools are manufactured by mixing a metal binder, Co powder, through a wet milling process to ensure higher toughness.

However, said manufacturing method has problems that the tungsten carbide (WC) particles are coarse by being compounded at high temperature, or that the milling process is performed for a long period of time at the time of adding Co powder. Also, in this manufacturing method, since the reduction process and carburization process are performed at high temperature, it is impossible to manufacture ultra fine powder.

As attempts to improve such conventional methods, there are Korean Patent Laid-Open Nos. 1998-0083671 & 2001-0113364, which relate to mechanochemical processes. Explaining this method in more detail, after preparing a solution appropriate for the target composition by dissolving tungsten salt ($AMT((NH_4)_6(H_2W_{12}O_{40}).4H_2O)$), cobalt salt ($Co(NO_3)_2.6H_2O$), and as grain-growth inhibitors, aqueous salt such as ammonium metavanadate (AMV), Cr-nitrate, Ta-chloride, which are salts of V, Cr, Ta in water, uniform precursors are manufactured by drying this at a spray dryer. Said uniform precursor manufactures a uniform tungsten-cobalt oxide by going through a salt removing process which removes the salt and water in the air, and this is reduced and carbonized to manufacture ultra fine cemented carbide composite powder. This method can manufacture ultra fine nano phase composite powder, but it has disadvantages such that the cost of the aqueous salt is relatively high, and that the processes for preparing a solution and spray drying are added.

As another method, in Korean Patent Laid-Open No. 2003-0024174, ultra fine cemented carbide powder is manufactured by performing reduction and carburization at the same time using hydrogen and expensive methane gas in a furnace after wet milling tungsten oxide ($WO_3$) and cobalt oxide ($Co_3O_4$) by an attritor. However, this method has fundamental problems in efficiency and economical efficiency since wet milling through the attritor takes a long period of time of at least 30 hours and a drying process is added thereafter. Further, it has been known that it is impossible to manufacture 0.3 μm sized ultra fine powder with the fine grinding process. Also, there are problems in stabilizing properties and mass-producing equipments according to the regulation of carbon content of the powder quality manufactured by performing reduction and carburization at the same time by inputting hydrogen, methane, hydrogen gas successively.

SUMMARY OF THE INVENTION

Therefore, it is an object of the present invention to provide a method for manufacturing ultra fine tungsten carbide-cobalt composite powder for cutting tools and wear resistant tools, which solves the problems the conventional method for manufacturing tungsten carbide-cobalt composite powder as stated in the above, and can manufacture economically excellent composite powder having excellent properties such as mechanical property and sound microstructure.

In order to achieve such object, the present provides a method for manufacturing ultra fine tungsten carbide-cobalt composite powder comprising a first dry mixing process for mixing tungsten compounds, cobalt compounds, and in some occasions, grain-growth inhibitors using a dry mixer, a calcination process for removing ammonia and moisture from the mixed powder and forming it into an oxide, a reduction process for manufacturing said calcined powder into pure metal powder, a second mixing process for milling by adding a carbon source, and in some occasions, a grain-growth inhibitor to said reduced powder, and a carburization process to manufacture the mixed powder into a final form.

Said manufacturing method is illustrated in the process flow chart of FIG. 1 to be easily understood.

Hereinafter, the manufacturing method of the present invention is described in more detail.

Among the raw materials used in the present invention, the raw materials of tungsten are tungsten compounds such as ammonium paratungstate (APT: $(NH_4)_{10}W_{12}O_{42}.5H_2O$), tungstic acid ($H_2WO_4$), and ammonium metatungstate (AMT: $(NH_4)_6(H_2W_{12}O_{40}).4H_2O$) including an ingredient that can basically become tungsten through the calcination and reduction processes.

As raw materials of cobalt, cobalt compounds such as cobalt oxalate ($CoC_2O_4.2H_2O$) cobalt acetate ($Co.CH_3COO)_2.4H_2O$) and cobalt sulfate ($CoO_4S.7H_2O$) including an ingredient that can basically become cobalt through the reduction process are used.

Meanwhile, as grain-growth inhibitors, metal compounds and oxides such as vanadium pentoxide ($V_2O_5$), vanadium trioxide ($V_2O_3$), ammonium vanadate ($NH_4VO_3$), chromium salt ($Cr(NO_3)_2$), chromium trioxide ($Cr_2O_3$), chromium acetate ($Cr(CH_3COO)_3$), tantalam pentoxide ($Ta_2O_5$), niobium chloride ($NbCl_5$), niobium pentoxide ($Nb_2O_5$), titanium dioxide ($TiO_2$), titanium chloride ($TiCl_2$), and tantalum chloride ($TaCl_5$) can be used in the first mixing process.

It is acceptable to mix and use one or more grain-growth inhibitors.

Above mentioned tungsten compounds, cobalt compounds, and grain-growth inhibitors if necessary are prepared for a target composition of WC-2~25 wt % Co-0.1~3 wt % grain-growth inhibitors, and mixed for 10~180 minutes using a mixer (first mixing process).

At this time, when it is mixed for a period of less than 10 minutes, homogeneous mixture can not be obtained, and thus distinction colors of the APT and Co compound is occurred. If it is mixed for more than 180 minutes, the powder adheres to each other inside the mixer as the mixing time increases.

As a mixer used for the mechanical mixing in said first dry mixing process, any one of a weightlessness mixer, V-mixer, Y-mixer, ball milling, double cone mixer, three-dimensional mixer, and super mixer can be selected.

Grain-growth inhibitors can be added in the first dry mixing process. Also, grain-growth inhibitors can be added in the later process without being added in the first mixing process.

After the mixing is completed, the mixed powder is calcinated in a heat treatment furnace at 500~1000° C. for 10~240 minutes in an atmospheric condition to form a composite powder of tungsten and cobalt composite oxide.

At this time, if the temperature is below 500° C., the calcination is not fully performed, and if the temperature exceeds 1000° C., the primary particle of the oxide does not grow uniformly. Therefore, the calcination temperature is 500~1000° C. At a calcination condition of 1000° C., the reaction is completed in 10 minutes, and at 500° C., the reaction is completed in 240 minutes.

The powder calcined as above is reduced in a furnace heat treatment at 500~1000° C. for 2~10 hours in a hydrogen atmosphere to form a mixed powder of tungsten and cobalt metals. The size of the final tungsten carbide-cobalt composite powder can be controlled to a size of 0.1~0.2 μm, 0.2~0.3 μm, 0.3~0.4 μm depending on the conditions such as reduction temperature, reaction time, loading weight of powder, the content of hydrogen.

At this time, if a temperature is below 500° C., the reduction reaction is not fully performed, and if the temperature exceeds 1000° C., the primary particle of the reduced powder grows coarsely. Therefore, the reduction temperature is 500~1000° C. At a reduction condition of 500° C., the reaction is completed in 10 hours, and at 1000° C., the reaction is completed in 2 hours.

If the grain-growth inhibitor is not added in said first mixing process, but added in the second mixing process, grain-growth inhibitors are added in the form of carbides (VC, TaC, NbC, TiC, $Cr_3C_2$) or oxides (vanadium pentoxide ($V_2O_5$), vanadium trioxide ($V_2O_3$), chromium trioxide ($Cr_2O_3$), tantalam pentoxide ($Ta_2O_5$), niobium pentoxide ($Nb_2O_5$), and titanium dioxide ($TiO_2$)) to the reduced powder together with carbon source, and deagglomerated and mixed in the pre-mixer and main mixer. At this time, the mixing quality and mixing time depend on the efficiency of the mixers, and a powder wherein each ingredient is uniformly distributed is formed.

As a mixer used for the dry mechanical mixing in said second mixing process, any one of a weightlessness mixer, V-mixer, Y-mixer, ball milling, double cone mixer, three-dimensional mixer, and super mixer can be selected.

Since the reduction process is already completed at the time of performing the second mixing process, grain-growth inhibitors in the form of a compound of salt, chloride, acid remain in the sintered product as they are and give bad influences to the properties, and thus are not used.

Meanwhile, as a carbon source, it is preferable to use high purity carbon black.

The powder wherein carbon source is mixed uniformly is carburized in a furnace at 600~1000° C. for 2~10 hours in a hydrogen atmosphere. Depending on said carburization condition, ultra fine tungsten carbide-cobalt composite powder whose size is regulated to 0.1~0.2 μm, 0.2~0.3 μm, and 0.3~0.4 μm can be obtained.

At this time, if a temperature is below 600° C., the carburization reaction is not fully performed, and if the temperature exceeds 1000° C., the particle of the carburized powder grows coarsely. Therefore, the carburization temperature is 600~1000° C. At a carburization condition of 1000° C., the reaction is completed in 2 hours, and at 600° C., the reaction is completed in around 10 hours.

Hereinafter, in order to understand the present invention in more detail, examples of the present invention are exemplified. However, the present invention is not restricted to the following examples.

DETAILED DESCRIPTION OF THE PREFERRED EMBODIMENTS

EXAMPLE 1

After charging the powder of ammonium paratungstate (APT: $(NH_4)_{10}W_{12}O_{42}.5H_2O$), cobalt oxalate ($CoC_2O_4.2H_2O$), vanadium pentoxide ($V_2O_5$), chromium trioxide ($Cr_2O_3$), tantalam pentoxide ($Ta_2O_5$), niobium pentoxide ($Nb_2O_5$) in a volume ratio of 65% using a weightlessness mixer in a target composition of WC-12 wt % Co-0.3 wt % $Cr_3C_2$/0.3 wt % VC/0.2 wt % TaNbC and uniformly mixing it in a mixing condition wherein the pin mill speed is 1300 RPM for 60 minutes, this powder is calcinated in a furnace at 650° C. for 30 minutes in an atmospheric condition to form tungsten and cobalt composite oxide. The calcinated powder is reduced in a tunnel type consecutive furnace at a final reaction temperature of 800° C. for 4 hours in a hydrogen atmosphere to form a composite powder wherein tungsten and cobalt metal are mixed with each other. Then, a milling process is performed by adding carbon black as a carbon source in a amount of 1.15 times of the stoichiometric value to the composite metal powder considering the decarbonization generated, during the carburization process to form a powder wherein all of the ingredients that are added thereto are homogeneously mixed. The mixed powder is carburized in a tunnel type consecutive furnace at a final reaction temperature of 800° C. for four hours in a hydrogen atmosphere to finally manufacture an ultra fine tungsten carbide-cobalt composite powder in a composition of WC-12 wt % Co-0.3 wt % $Cr_3C_2$/0.3 wt % VC/0.2 wt % TaNbC.

Figure 1:
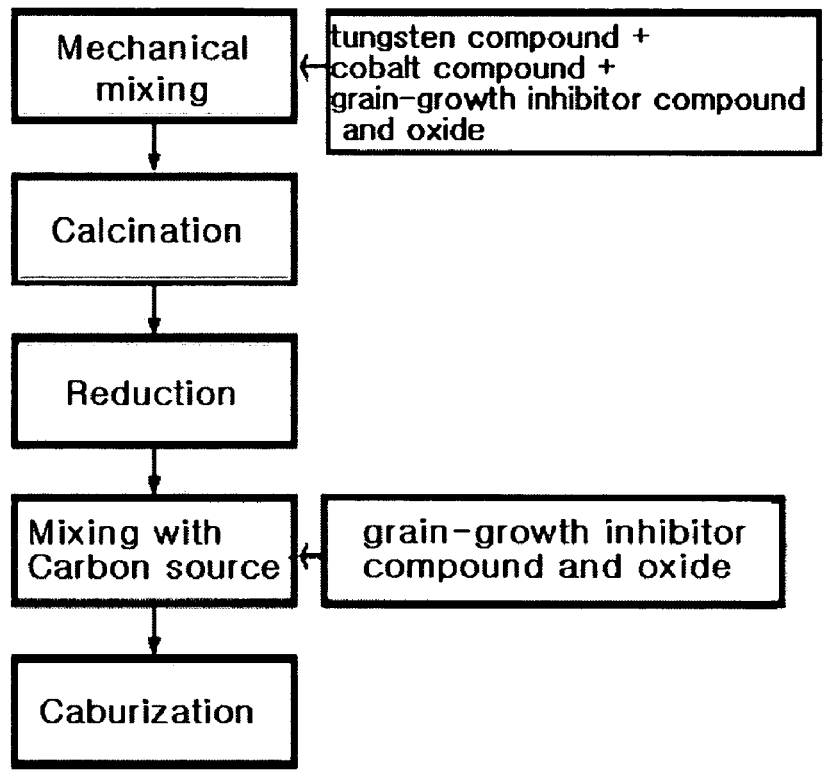
FIG. 1 is a drawing of the process for manufacturing ultra fine tungsten carbide-cobalt composite powder.
Figure 2A:
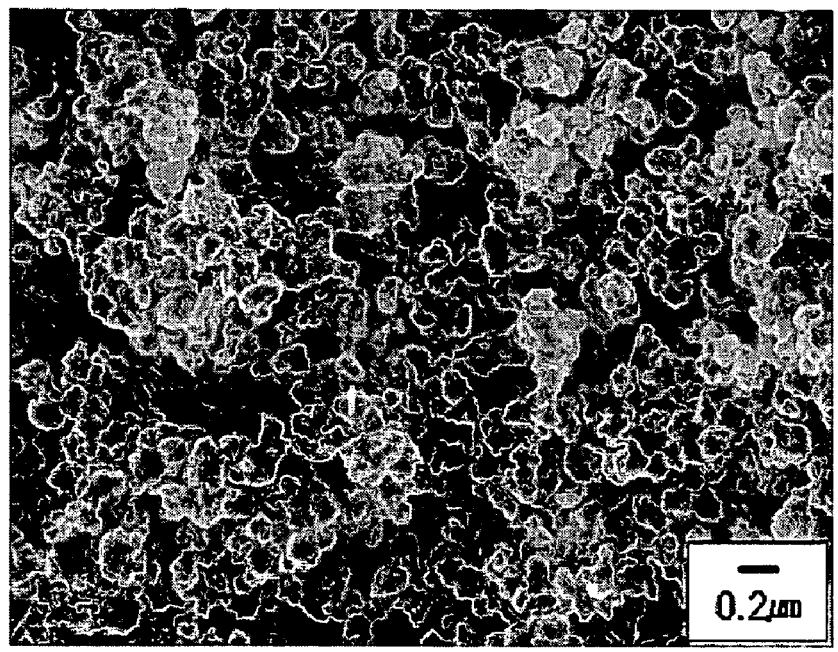
FIG. 2a is a field emission scanning electronic microscope photograph of a 0.1~0.2 μm sized ultra fine tungsten carbide-cobalt composite powder manufactured in example 1 of the present invention.
Figure 2B:
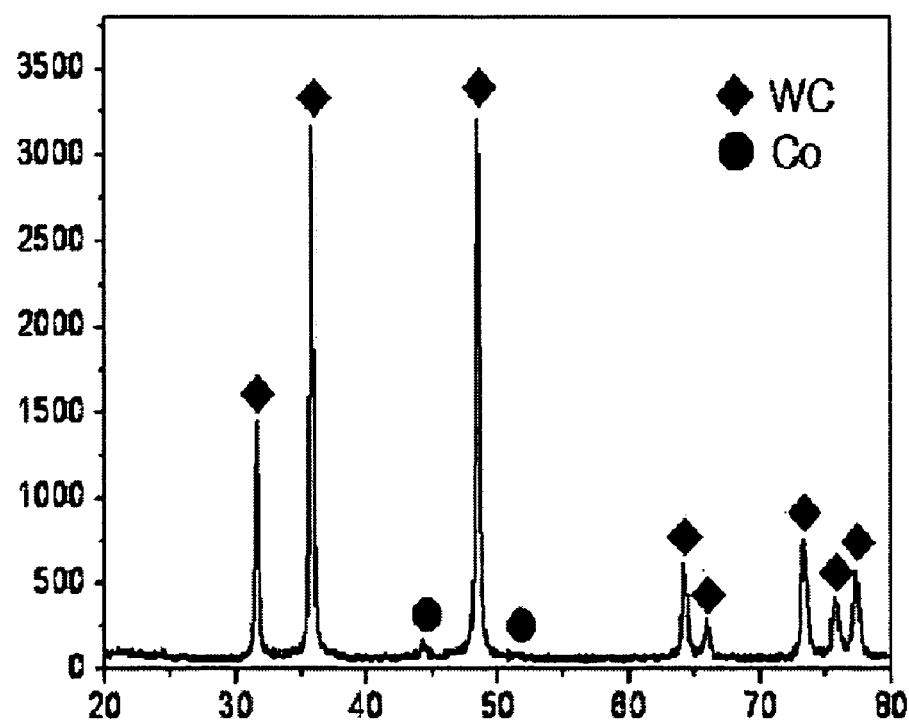
FIG. 2b is a graph illustrating the x-ray diffraction analysis result of a 0.1~0.2 μm sized ultra fine tungsten carbide-cobalt composite powder manufactured in example 1 of the present invention.

① As a result of observing the shape and size of the manufactured powder with a field emission scanning electric microscope (FE-SEM), as shown in FIG. 2a, particles of 0.1 ~0.2 μm were produced. As a result of analyzing the x-ray diffraction of the phase of the manufactured powder, as shown in FIG. 2b, the powder was a tungsten carbide-cobalt composite powder wherein WC phase and Co phase are both present. From such analysis result, it can be confirmed that uniform 0.1~0.2 μm sized ultra fine tungsten carbide-cobalt composite powder is manufactured.

Figure 2C:
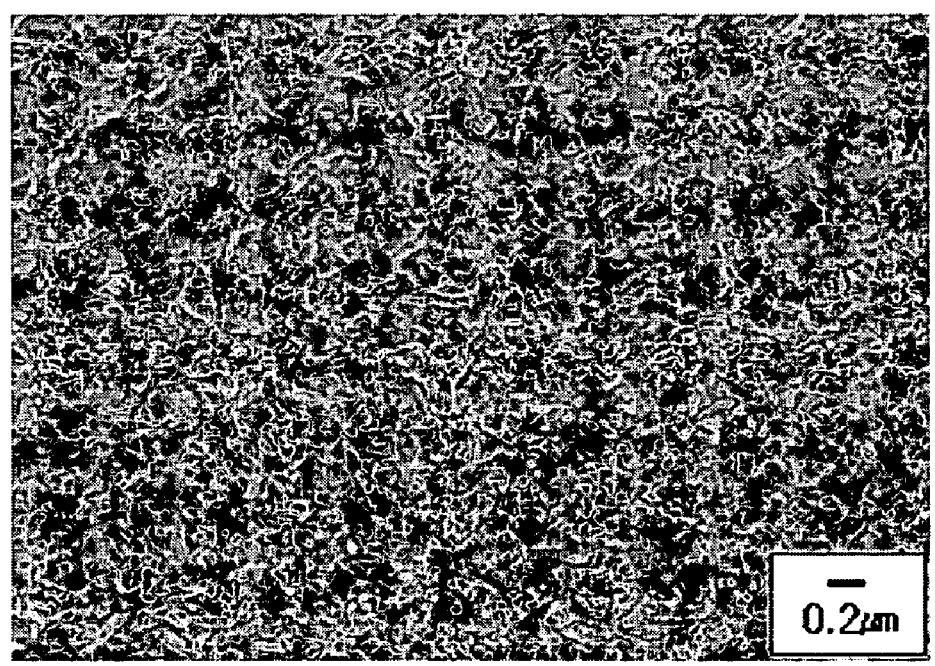
FIG. 2c is a field emission scanning electronic microscope photograph of a bulk sintered with a 0.1~0.2 μm sized ultra fine tungsten carbide-cobalt composite powder manufactured in example 1 of the present invention.

Next, the mechanical properties presented at the time of being compounded to a sintered product using the ultra fine tungsten carbide-cobalt composite powder compounded through said process are shown in Table 1 in comparison with a 0.2 μm sized nano phase cemented carbide material. FIG. 2c shows the result of observing a 0.1~0.2 μm sized ultra fine tungsten carbide grain in said sintered product with a field emission scanning electronic microscope.

As a result of such analysis, it is shown that the coercive force and hardness showing the minuteness of the tungsten carbide grain within the sintered product are superior, and the transverse rupture strength value is similar. Such results are property values higher than the product sintered using a foreign nano scale cemented carbide powder, which are bulk properties showing that the powder is a 0.1~0.2 μm sized ultra fine tungsten carbide-cobalt composite powder.

TABLE 1

| WC-12 wt % Co | Total amount of carbon (wt %) | Saturated magnetic field (%) | Coercive force (Oe) | Hardness (HRa) | Hardness ($Hv_{30 kg}$) | Transverse rupture strength (N/mm$^2$) |
|---|---|---|---|---|---|---|
| APT + Co Oxalate (0.1~0.2 μm) | 5.47 | 79.2 | 439 | 93.3 | 1798 | 4212 |
| Comparison with 0.2 μm bulk (foreign company C) | 5.39 | 76.1 | 398 | 92.6 | 1720 | 4280 |

EXAMPLE 2

Figure 3A:
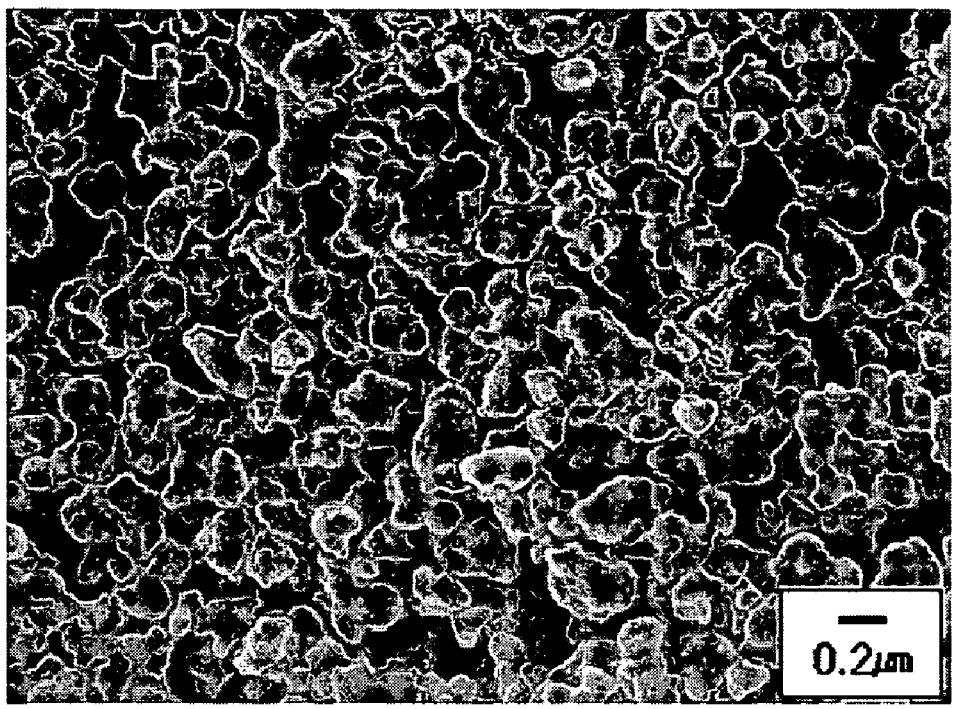
FIG. 3a is a field emission scanning electronic microscope photograph of a 0.2~0.3 μm sized ultra fine tungsten carbide-cobalt composite powder manufactured in example 2 of the present invention.

Except that paratungstate (APT: $(NH_4)_{10}W_{12}O_{42}.5H_2O$), cobalt oxalate ($CoC_2O_4.2H_2O$), ammonium vanadate ($NH_4VO_3$), chromium salt ($Cr(NO_3)_2$), tantalum chloride ($TaCl_5$), niobium chloride ($NbCl_5$) are used as the initial starting material, and that the target composition is WC-9 wt % Co-0.3 wt % $Cr_3C_2$/0.3 wt % VC/0.15 wt % TaNbC, and that metal composite powder is formed in a tunnel type furnace at a final reduction temperature of 820° C. for three hours in a hydrogen atmosphere, and that it is compounded in a tunnel type carburization furnace at 820° C. for three hours in a hydrogen atmosphere, a 0.2~0.3 μm sized ultra fine tungsten carbide-cobalt composite powder is manufactured by the same method as example 1. This can be confirmed from the field emission scanning electric microscope in FIG. 3a.

In particular, comparing said particle size with that of example 1, it shows that the particle size of the final tungsten carbide-cobalt composite powder can be regulated depending on the reaction temperature and reaction time for each process.

Figure 3B:
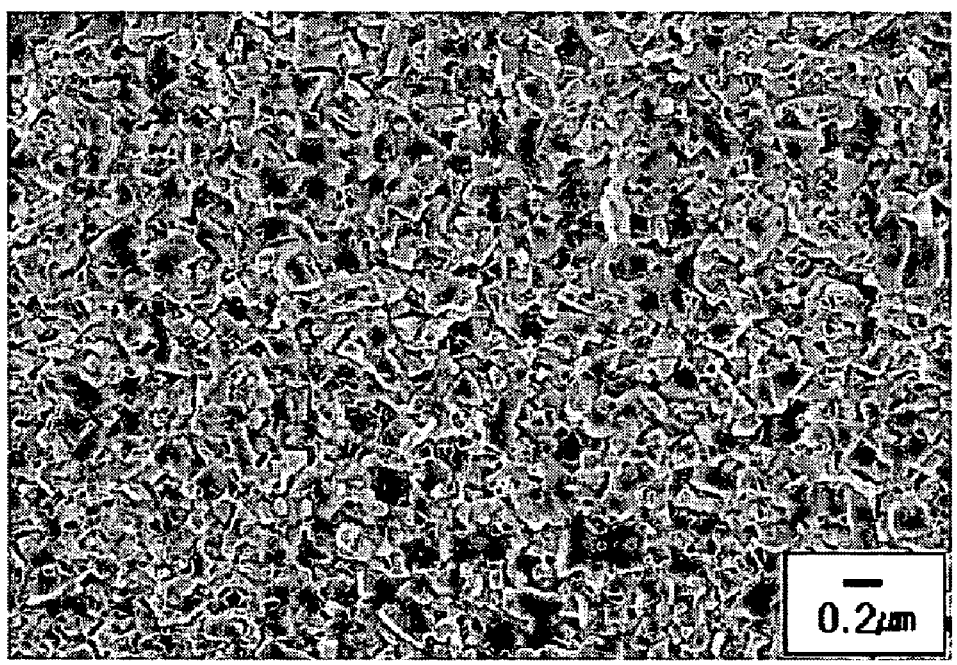
FIG. 3b is a field emission scanning electronic microscope photograph of a bulk sintered with a 0.2~0.3 μm sized ultra fine tungsten carbide-cobalt composite powder manufactured in example 2 of the present invention.

Next, the mechanical properties of a bulk formed by sintering the ultra fine tungsten carbide-cobalt composite powder compounded through said process is shown in Table 2 in comparison with a 0.3 μm sized tungsten carbide product. FIG. 3b shows the result of observing a 0.2~0.3 μm sized ultra fine tungsten carbide grain in said bulk with a field emission scanning electronic microscope. It is shown that the coercive force and hardness showing the minuteness of the tungsten carbide grain within the sintered product are superior for the same WC-9 wt % Co composition, and that the transverse rupture strength value is also superior due to the uniform mixture of WC/Co in spite of reducing grain size. Such results are bulk properties showing that the powder is a 0.2~0.3 μm sized ultra fine tungsten carbide-cobalt composite powder.

TABLE 2

| WC-9 wt % Co | Total amount of carbon (wt %) | Saturated magnetic field (%) | Coercive force (Oe) | Hardness (HRa) | Hardness ($Hv_{30\,kg}$) | transverse rupture strength (N/mm$^2$) |
|---|---|---|---|---|---|---|
| APT + Co Oxalate (0.2~0.3 μm) | 5.65 | 80.2 | 502 | 93.8 | 1944 | 4032 |
| Comparison with 0.3 μm bulk (foreign company A) | 5.61 | 76.8 | 485 | 93.7 | 1922 | 3665 |

EXAMPLE 3

Figure 4A:
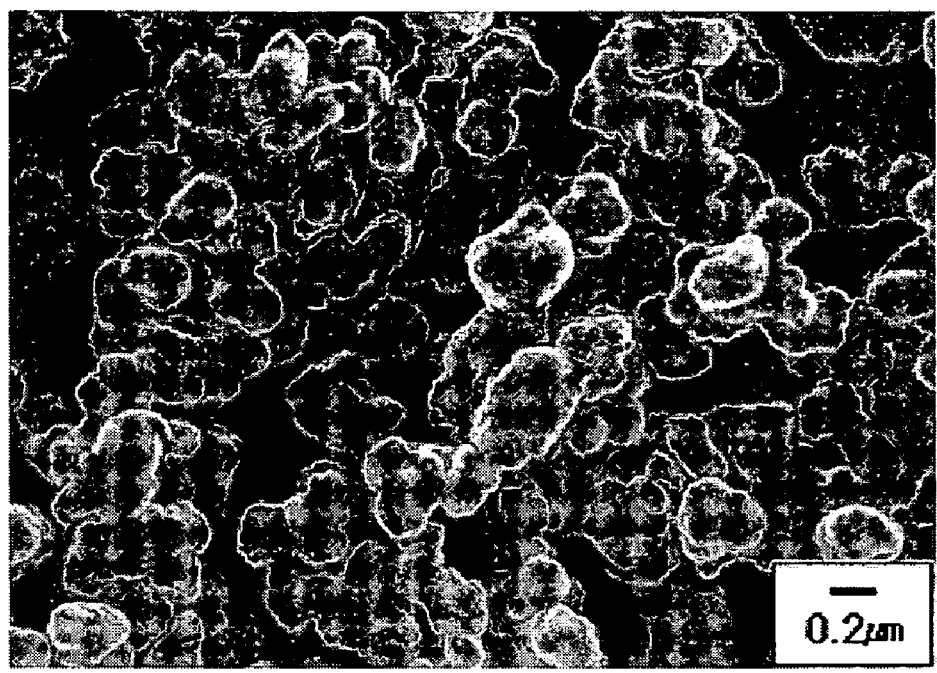
FIG. 4a is a field emission scanning electronic microscope photograph of a 0.3~0.4 μm sized ultra fine tungsten carbide-cobalt composite powder manufactured in example 3 of the present invention.

Except that tungstic acid ($H_2WO_4$), cobalt acetate ($Co.CH_3COO)_2.4H_2O$), vanadium pentoxide ($V_2O_5$), chromium trioxide ($Cr_2O_3$), tantalam pentoxide ($Ta_2O_5$), niobium pentoxide ($Nb_2O_5$) are used as the initial starting material, and that the target composition is WC-10 wt % Co-0.4 wt % $Cr_3C_2$/0.2 wt % VC/0.2 wt % TaNbC, and that the powder is charged in a volume ratio of 55% using a Y-mixer and mixed in a mixing condition wherein the main shaft rotation speed is 100 RPM, sub shaft rotation speed is 350 RPM for 120 minutes, and that oxide is formed in the rotary klin type consecutive furnace at a temperature of 700° C. for 30 minutes in an atmospheric condition, and that it is compounded in a tunnel type carburization furnace at 820° C. for four hours in a hydrogen atmosphere, a 0.3~0.4 μm sized ultra fine tungsten carbide-cobalt composite powder is manufactured by the same method as example 1. This can be confirmed from the field emission scanning electric microscope in FIG. 4a. In particular, comparing said particle size with example 1, it shows that the particle size of the final tungsten carbide-cobalt composite powder can be regulated depending on the type of compound of the tungsten and cobalt raw material and the reaction temperature.

Figure 4B:
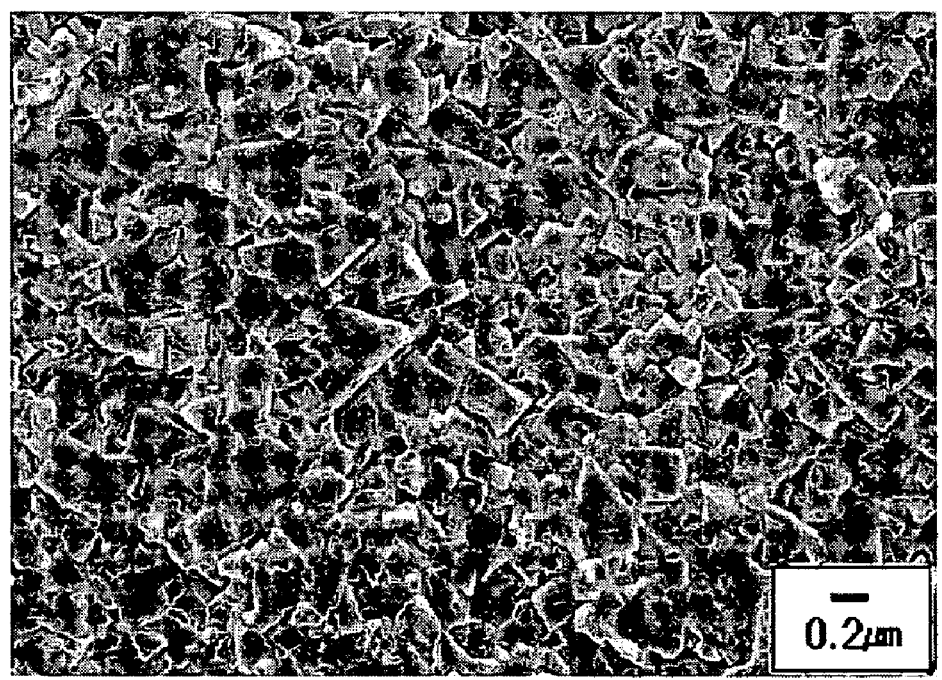
FIG. 4b is a field emission scanning electronic microscope photograph of a bulk sintered with a 0.3~0.4 μm sized ultra fine tungsten carbide-cobalt composite powder manufactured in example 3 of the present invention.

Next, the mechanical properties of a bulk formed by sintering the ultra fine cemented carbide composite powder compounded through said process is shown in Table 3 in comparison with a 0.6 μm sized material that is currently widely used. FIG. 4b shows the result of observing a 0.3~0.4 μm sized ultra fine tungsten carbide sintered grain in said sintered product with a field emission scanning electronic microscope. Analyzing the results, it is shown that even though the tungsten carbide grain within the sintered product is minute such as 0.3~0.4 μm for the same WC-10 wt % Co composition, the transverse rupture strength value was similar and the coercive force and hardness were absolutely superior.

EXAMPLE 4

Figure 5A:
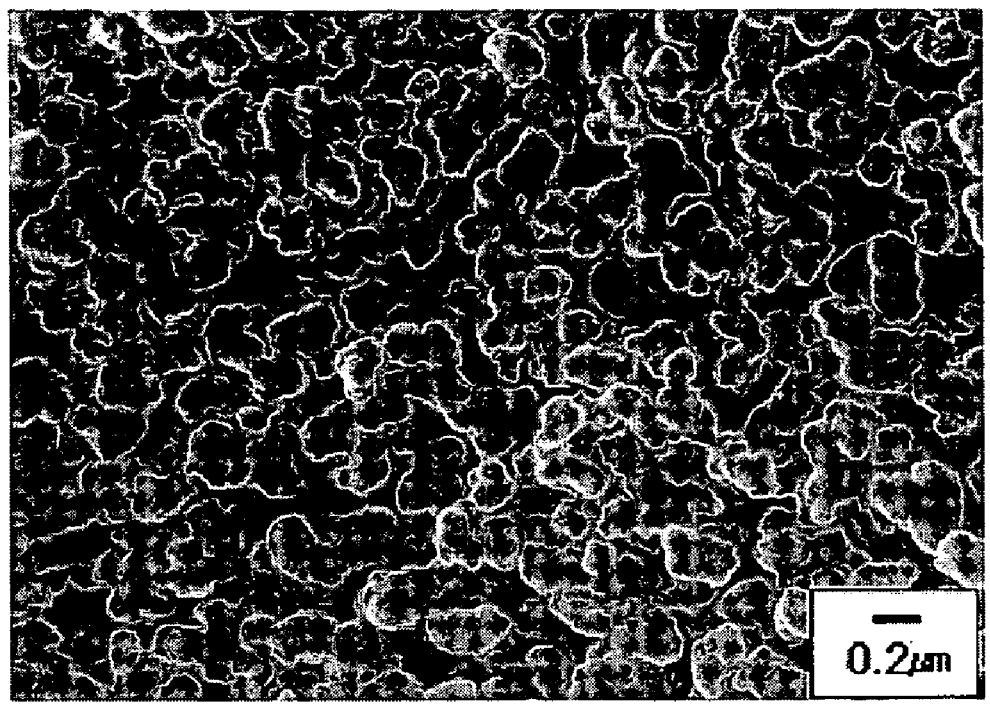
FIG. 5a is a field emission scanning electronic microscope photograph of an ultra fine tungsten carbide-cobalt composite powder manufactured by adding a grain-growth inhibitor in the form of a compound during the first mixing process in example 4 of the present invention.
Figure 6A:
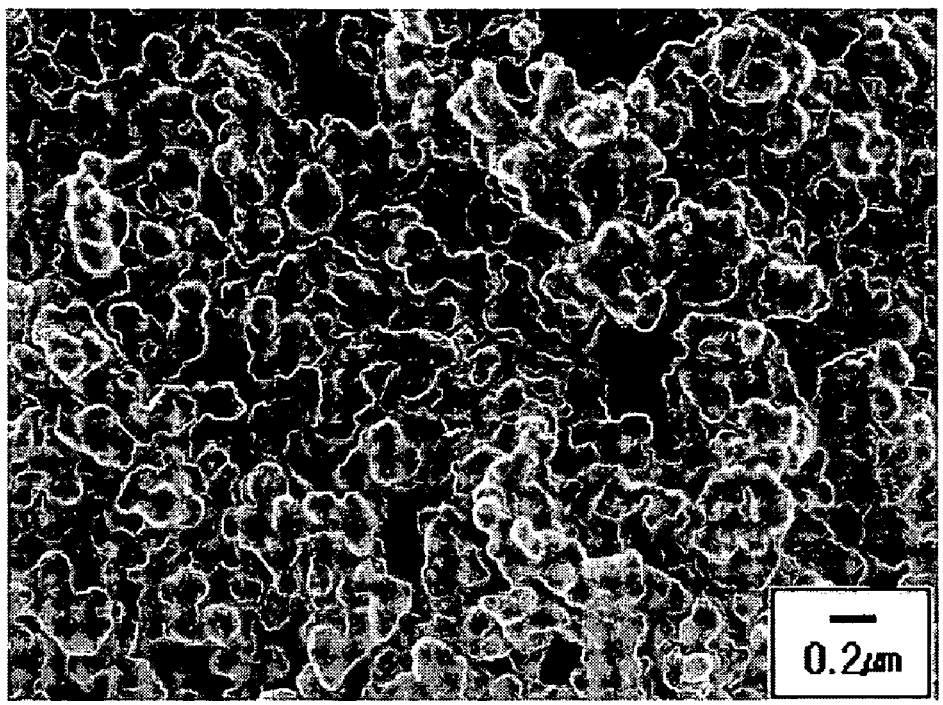
FIG. 6a is a field emission scanning electronic microscope photograph of a tungsten carbide-cobalt composite powder manufactured by adding a grain-growth inhibitor in the form of a carbide during the second mixing process in example 4 of the present invention.
Figure 7A:
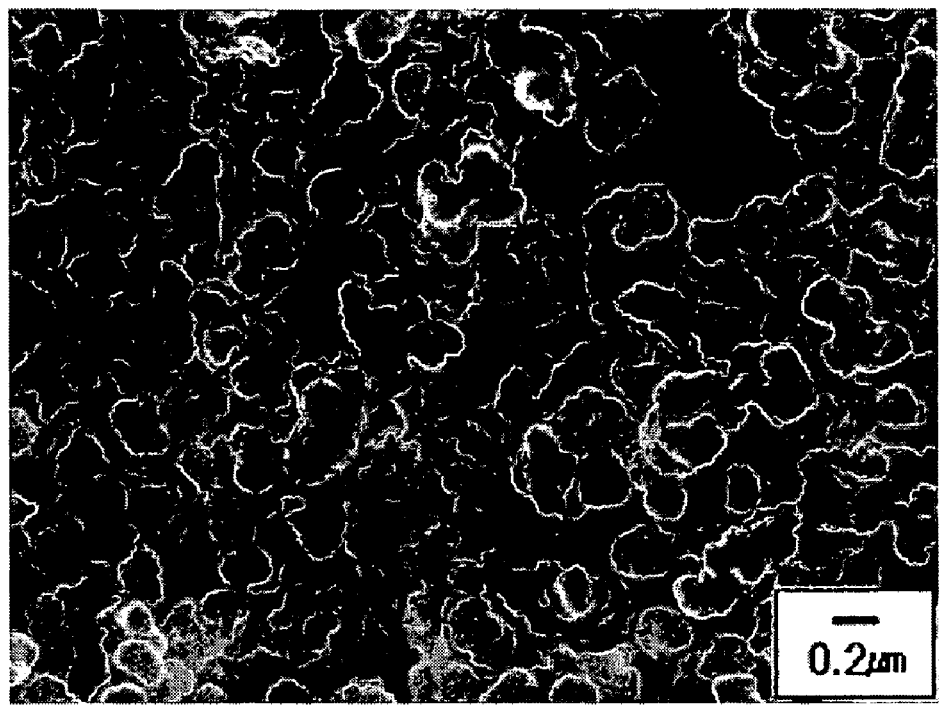
FIG. 7a is a field emission scanning electronic microscope photograph of a fine tungsten carbide-cobalt composite powder manufactured by adding a grain-growth inhibitor in the form of an oxide during the second mixing process in example 4 of the present invention.

Except that para-tungstate (APT: $(NH_4)_{10}W_{12}O_{42}.5H_2O$) and cobalt oxalate ($CoC_2O_4.2H_2O$) are used as the initial starting material, and that the target composition is WC-8 wt % Co-0.4 wt % $Cr_3C_2$/0.4 wt % VC/0.2 wt % TaNbC, and that grain-growth inhibitor is added in the first mixing process in the form of metal compounds (ammonium vanadate ($NH_4VO_3$), chromium nitrate ($Cr(NO_3)_2$), niobium chloride ($NbCl_5$)) and oxide (tantalam pentoxide ($Ta_2O_5$)), and in the second mixing process in the form of metal carbide (VC, $Cr_3C_2$, TaNbC) and oxide ($V_2O_5$, $Cr_2O_3$, $Ta_2O_5$, $Nb_2O_5$), and that the powder is charged in a volume ratio of 50% using a ball mill machine and mixed in a mixing condition wherein the main shaft rotation is 30 RPM for 180 minutes, an ultra fine tungsten carbide-cobalt composite powder is manufactured by the same method as example 1. The particle size of the ultra fine composite powder can be confirmed from the field emission scanning electric microscope in FIGS. 5a, 6a, 7a.

Figure 5B:
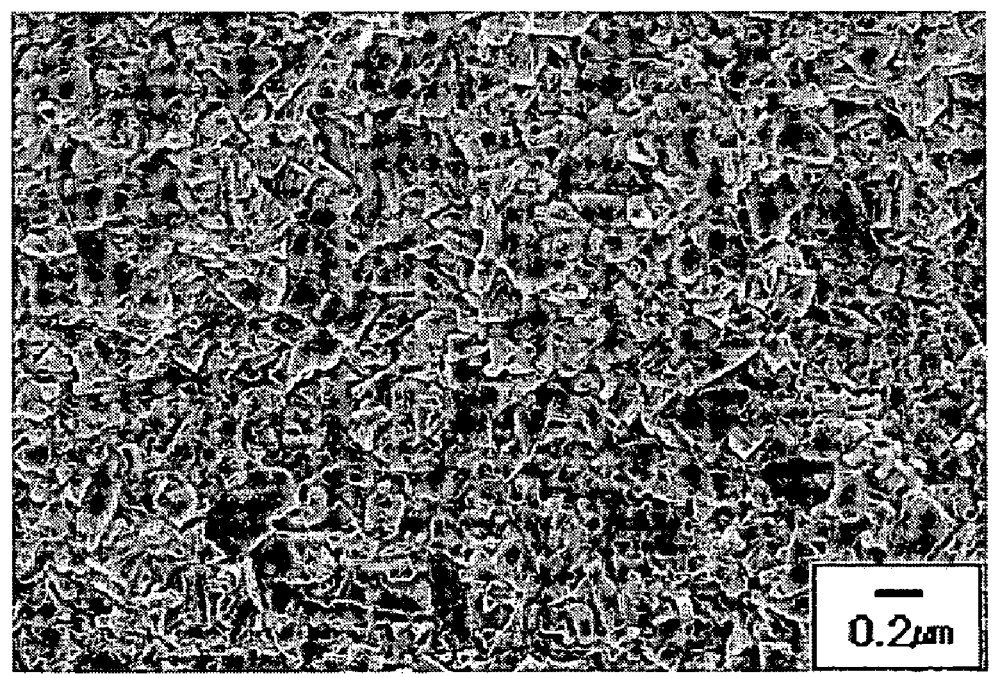
FIG. 5b is a field emission scanning electronic microscope photograph of a sintered bulk of an ultra fine tungsten carbide-cobalt composite powder manufactured by adding a grain-growth inhibitor in the form of a compound during the first mixing process in example 4 of the present invention.
Figure 6B:
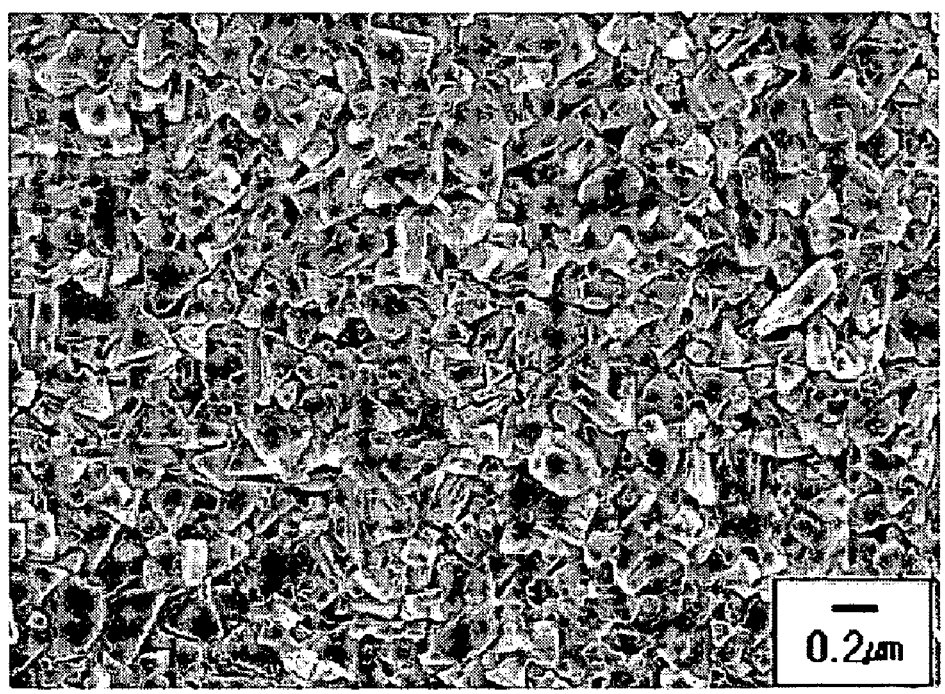
FIG. 6b is a field emission scanning electronic microscope photograph of a sintered bulk of a tungsten carbide-cobalt composite powder manufactured by adding a grain-growth inhibitor in the form of a carbide during the second mixing process in example 4 of the present invention.
Figure 7B:
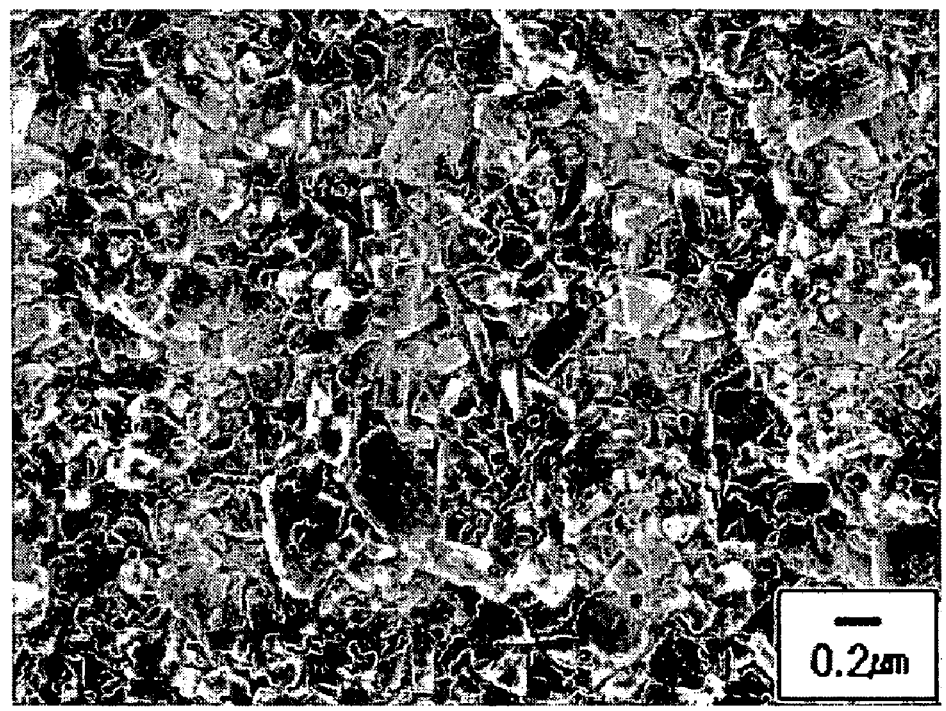
FIG. 7b is a field emission scanning electronic microscope photograph of a sintered bulk of a tungsten carbide-cobalt composite powder manufactured by adding a grain-growth inhibitor in the form of an oxide during the second mixing process in example 4 of the present invention.

Next, the mechanical properties of a bulk formed by sintering using the ultra fine tungsten carbide composite powder compounded through said process is shown in Table 4. FIGS. 5b, 6b, 7b show the properties of sintered ultra fine tungsten carbide grain depending on the addition time and form of grain-growth inhibitor with a field emission scanning electronic microscope. Analyzing the results, regarding the coercive force and hardness showing the minuteness of a cemented carbide particle within the sintered product for the same WC-8 wt % Co-0.4 wt % $Cr_3C_2$/0.4 wt % VC/0.2 wt % TaNbC composition show a relatively higher property value is shown in case where the grain-growth inhibitor is added in the dry mechanical mixing process. The grain-growth inhibiting effect obtained from addition of the inhibitor in the carbon source mixing process in the form of carbide was similar to the case of addition in the form of oxide.

TABLE 3

| WC-10 wt % Co | Total amount of carbon (wt %) | Saturated magnetic field (%) | Coercive force (Oe) | Hardness (HRa) | Hardness ($Hv_{30\,kg}$) | transverse rupture strength (N/mm$^2$) |
|---|---|---|---|---|---|---|
| (H2WO4) + Co Acetate (0.3~0.4 μm) | 5.54 | 78.2 | 451 | 93.4 | 1844 | 4012 |
| Comparison with 0.6 μm bulk (foreign company K) | 5.55 | 77.2 | 223 | 91.6 | 1540 | 4101 |

TABLE 4

| WC-8 wt % Co (APT + Co oxalate) | Total amount of carbon (wt %) | Saturated magnetic field (%) | Coercive force (Oe) | Hardness (HRa) | Hardness ($Hv_{30\,kg}$) | Transverse rupture strength (N/mm$^2$) |
|---|---|---|---|---|---|---|
| Added during the mechanical mixing process/compound form (FIGS. 5a & 5b) | 5.68 | 82.5 | 564 | 94.1 | 1962 | 3841 |
| Added during the carbon source mixing process/carbide form (FIGS. 6a & 6b) | 5.69 | 83.8 | 532 | 93.9 | 1941 | 3772 |
| Added during the carbon source mixing process/oxide form (FIGS. 7a & 7b) | 5.68 | 82.8 | 541 | 93.9 | 1943 | 3878 |

Using the manufacturing method of the present invention stated above, it is possible to compound and manufacture ultra fine cemented carbide composite powder of 0.1~0.4 μm. Also, it is possible to regulate the particle size to 0.1~0.2 μm, 0.2~0.3 μm, 0.3~0.4 μm depending on the type of compound, composition condition for each process, time of adding grain-growth inhibitor. In particular, the advantage of the ultra fine tungsten carbide composite powder manufactured according to the present invention is that it has high hardness and high coercive force for the same composition. Also, in general, if the grain size of the tungsten carbide gets minute, the transverse rupture strength decreases. However, due to the effect of the uniform mixture of the cobalt of the binder phase, it became possible to manufacture an ultra fine tungsten carbide composite powder having a similar transverse rupture strength in comparison with the coarse particle material.

Also, it has effects such that tungsten compounds, cobalt compounds, grain-growth inhibitor compounds of low price which have price competitiveness are used as raw materials, and that ultra fine cemented carbide composite powder can be manufactured economically by shortening and simplifying the manufacturing process.

What is claimed is:

1. A method for manufacturing ultra fine tungsten carbide-cobalt composite powder characterized in comprising:
    a first mixing process for mechanically mixing powder of tungsten compounds with powder of cobalt compounds;
    a calcination process for removing ammonia and moisture from the powder mixed in said first mixing process and forming it into an oxide;
    a reduction process for manufacturing said calcined powder into pure metal powder;
    a second mixing process for adding carbon source to said reduced powder; and
    a carburization process for carburizing the powder mixed in said second mixing process to manufacture tungsten carbide-cobalt composite powder.

2. The method for manufacturing ultra fine tungsten carbide-cobalt composite powder according to claim 1, characterized in adding a grain-growth inhibitor in the form of a metal compound in at least one of the first mixing process and second mixing process.

3. The method for manufacturing ultra fine tungsten carbide-cobalt composite powder according to claim 2, characterized in that the grain-growth inhibitor of said first mixing process is at least any one of vanadium pentoxide ($V_2O_5$), vanadium trioxide ($V_2O_3$), ammonium vanadate ($NH_4VO_3$), chromium salt ($Cr(NO_3)_2$), chromium trioxide ($Cr_2O_3$), chromium acetate ($Cr(CH_3COO)_3$), tantalum pentoxide ($Ta_2O_5$), niobium chloride ($NbCl_5$), niobium pentoxide ($Nb_2O_5$), titanium dioxide ($TiO_2$), titanium chloride ($TiCl_2$), and tantalum chloride ($TaCl_5$).

4. The method for manufacturing ultra fine tungsten carbide-cobalt composite powder according to claim 2, characterized in that the grain-growth inhibitor of said second mixing process is at least any one of vanadium carbide (VC), chromium carbide ($Cr_3C_2$), Tantalum niobium carbide (TaNbC), titanium carbide (TiC), vanadium pentoxide ($V_2O_5$), vanadium trioxide ($V_2O_3$), chromium trioxide ($Cr_2O_3$), tantalam pentoxide ($Ta_2O_5$), niobium pentoxide ($Nb_2O_5$), and titanium dioxide ($TiO_2$).

5. The method for manufacturing ultra fine tungsten carbide-cobalt composite powder according to claim 1, characterized in that said tungsten compound is ammonium paratungstate (($NH_4)_{10}W_{12}O_{42}.5H_2O$), tungstic acid ($H_2WO_4$), and ammonium metatungstate (($NH_4)_6(H_2W_{12}O_{40}).4H_2O$).

6. The method for manufacturing ultra fine tungsten carbide-cobalt composite powder according to claim 1, characterized in that said cobalt compound is cobalt oxalate ($CoC_2O_4.2H_2O$), cobalt acetate ($Co.CH_3COO)_2.4H_2O$), and cobalt sulfate ($CoO_4S.7H_2O$).

7. The method for manufacturing ultra fine tungsten carbide-cobalt composite powder according to claim 1, characterized in that the mechanical mixing method for said first mixing process is a mixing method using any one of a weightlessness mixer, V-mixer, Y-mixer, ball milling, double cone mixer, three-dimensional mixer, and super mixer.

8. The method for manufacturing ultra fine tungsten carbide-cobalt composite powder according to claim 1, characterized in that the calcination condition of said calcination process is 500~1000° C., 10~240 minutes, and atmosphere condition.

9. The method for manufacturing ultra fine tungsten carbide-cobalt composite powder according to claim 1, characterized in that the reduction condition of said reduction process is 500~1000° C., 2~10 hours, and hydrogen atmosphere.

10. The method for manufacturing ultra fine tungsten carbide-cobalt composite powder according to claim 1, characterized in that the carburization condition of the carburization process is 600~1000° C., 2~10 hours, and hydrogen atmosphere.

* * * * *